United States Patent
Yi et al.

(10) Patent No.: US 9,637,121 B2
(45) Date of Patent: May 2, 2017

(54) METHOD FOR EXECUTING AN EVASIVE MANEUVER, COMPUTER PROGRAM PRODUCT AND MOTOR VEHICLE

(71) Applicant: GM GLOBAL TECHNOLOGY OPERATIONS LLC, Detroit, MI (US)

(72) Inventors: Boliang Yi, Rüsselsheim (DE); Frank Bonarens, Oberursel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/951,860

(22) Filed: Nov. 25, 2015

(65) Prior Publication Data

US 2016/0152236 A1 Jun. 2, 2016

(30) Foreign Application Priority Data

Nov. 27, 2014 (DE) .......................... 10 2014 017 594

(51) Int. Cl.
*B60W 10/18* (2012.01)
*B60W 30/09* (2012.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
USPC .... 701/301, 302, 36, 41, 42, 43, 44, 78, 79, 701/80, 81; 340/436, 903
See application file for complete search history.

(56) References Cited

U.S. PATENT DOCUMENTS 5,170,352 A * 12/1992 McTamaney ........ G05D 1/0236
    318/587
6,393,362 B1 * 5/2002 Burns .................. G05D 1/0278
    340/940

(Continued)

FOREIGN PATENT DOCUMENTS

DE       10102772 A1    7/2002
DE    102007007282 A1   9/2007
DE    102009020649 A1  11/2010

OTHER PUBLICATIONS

German Patent Office, German Search Report for German Application No. 102014017594.4, dated Aug. 7, 2015.

*Primary Examiner* — Thomas Tarcza
*Assistant Examiner* — Richard Goldman
(74) *Attorney, Agent, or Firm* — Lorenz & Kopf, LLP.

(57) ABSTRACT

A method, control unit and computer program product is disclosed for executing an evasive maneuver of a motor vehicle. If an obstacle is detected in the vehicle's path, the evasive maneuver is initiated and a nominal trajectory is calculated. Control devices of the motor vehicle are actuated in such a way that the motor vehicle drives along the nominal trajectory under normal road conditions. The evasive maneuver is executed as calculated if the motor vehicle moves along the nominal trajectory. An alternative trajectory, which is actually possible with respect to the driving dynamics under the given road conditions, is calculated based on the reaction of the motor vehicle to the actuation of its control devices if the motor vehicle does not move along the nominal trajectory. The evasive maneuver is executed along the alternative trajectory.

12 Claims, 2 Drawing Sheets

(51) Int. Cl.
 *B60W 10/20* (2006.01)
 *B60W 10/184* (2012.01)
 *B60W 30/02* (2012.01)
(52) U.S. Cl.
 CPC ......... *B60W 30/02* (2013.01); *B60W 2520/14* (2013.01); *B60W 2520/20* (2013.01); *B60W 2550/10* (2013.01); *B60W 2550/148* (2013.01)

(56) References Cited

U.S. PATENT DOCUMENTS

| | | | |
|---|---|---|---|
| 6,604,036 B2 * | 8/2003 | Pallot | B60T 8/1755 701/48 |
| 6,926,374 B2 * | 8/2005 | Dudeck | B60T 7/22 303/191 |
| 7,797,107 B2 * | 9/2010 | Shiller | B60R 21/013 180/168 |
| 8,630,762 B2 * | 1/2014 | Staempfle | G08G 1/166 340/436 |
| 8,781,722 B2 * | 7/2014 | Flehmig | B60W 30/09 701/301 |
| 2007/0088469 A1 * | 4/2007 | Schmiedel | G05D 1/0274 701/23 |
| 2009/0099728 A1 * | 4/2009 | Ichinose | B62D 15/0265 701/39 |
| 2011/0035086 A1 * | 2/2011 | Kim | G05D 1/0238 701/23 |
| 2012/0022747 A1 * | 1/2012 | Zagorski | B60T 8/172 701/48 |
| 2012/0065861 A1 * | 3/2012 | Hartmann | B60T 8/17558 701/71 |
| 2013/0253815 A1 * | 9/2013 | Orfila | G08G 1/166 701/301 |
| 2014/0074388 A1 * | 3/2014 | Bretzigheimer | B60T 1/10 701/117 |
| 2014/0379244 A1 * | 12/2014 | Haeussler | G08G 1/165 701/117 |
| 2015/0120138 A1 * | 4/2015 | Zeng | B62D 15/0265 701/41 |
| 2015/0158528 A1 * | 6/2015 | Moshchuk | B62D 15/0265 701/41 |
| 2016/0152236 A1 * | 6/2016 | Yi | B60W 30/09 701/36 |
| 2016/0159327 A1 * | 6/2016 | Flehmig | B60T 7/22 701/41 |
| 2016/0187880 A1 * | 6/2016 | Chen | G05D 1/0088 701/27 |

* cited by examiner

METHOD FOR EXECUTING AN EVASIVE MANEUVER, COMPUTER PROGRAM PRODUCT AND MOTOR VEHICLE

CROSS-REFERENCE TO RELATED APPLICATION

This application claims priority to German Patent Application No. 102014017594.4, filed Nov. 27, 2014, which is incorporated herein by reference in its entirety.

TECHNICAL FIELD

The present disclosure pertains to a method for executing an evasive maneuver of a motor vehicle, in which an obstacle is detected and the evasive maneuver is initiated. The present disclosure furthermore pertains to a computer program product, as well as to a corresponding motor vehicle.

BACKGROUND

DE 10 2009 047 360 A1 discloses a method for influencing the lateral dynamics of a vehicle during an evasive maneuver with the aid of a vehicle controller that controls the slip angle and/or the yaw rate of the motor vehicle and triggers an automatic control action when a predefined threshold value is exceeded. In this case, the driving situation is monitored with respect to an obstacle and different control actions are carried out depending on the classification of the situation. In this way, the control actions are optimized with respect to stability and comfort such that optimal performance of the vehicle is achieved in any driving situation.

DE 10 2007 007 282 A1 discloses a method for estimating adhesion factors. To this end, a traction value is individually estimated per axle based on the lateral forces and axle loads determined in a model and the adhesion factor of the roadway is estimated based on a comparison of the two traction values.

SUMMARY

Hazardous situations, in which a motor vehicle has to evade an obstacle, occasionally arise in road traffic. Such hazardous situations require a fast control action that sometimes reaches the limits of the driving dynamics of the motor vehicle. The road conditions significantly influence the limits of the driving dynamics. For example, adhesion factors between the tires and the roadway can depend on external factors such as the roadway surface, wetness, a roadway surface layer in the form of snow, ice, soil, sand, soil and the like, as well as the temperatures and other factors. On the part of the motor vehicle, other influencing factors may be the load condition, the tire condition, the tire pressure, the tire brand, etc. The same evasive maneuver therefore cannot be executed in identical situations under different external and motor vehicle conditions.

In fact, an optimal evasive reaction can only be achieved if it is determined anew in dependence on the specific driving dynamics parameters, as well as the limits resulting thereof. In this context, it is possible, among other things, to incrementally approach the respective limiting values, i.e. to increase the longitudinal and lateral accelerations until the respective limits are reached. It is furthermore possible to define low limiting values, at which driving is usually possible. However, valuable space for the evasion is respectively wasted in each case.

In accordance with the present disclosure, conventional methods of stability control may be enhanced in such a way that optimal evasive maneuvers can be executed under all circumstances. In particular, a method for executing an evasive maneuver of a motor vehicle is described below. In the context of this method, an obstacle is detected and the evasive maneuver is initiated in that a nominal trajectory is calculated. The nominal trajectory usually is a trajectory that causes no damage or the least possible damage to the motor vehicle and to the obstacle.

After the calculation of the nominal trajectory, control devices of the motor vehicle are actuated in such a way that the motor vehicle is driven along the nominal trajectory under normal road conditions. Under normal conditions, this is the best possible trajectory and allows the best reaction in light of the circumstances. In this respect, it is proposed that the evasive maneuver is executed as calculated if the motor vehicle moves along the nominal trajectory.

However, if the motor vehicle does not move along the nominal trajectory, an alternative trajectory, which is actually possible with respect to the driving dynamics under the given road conditions, is calculated based on the reaction of the motor vehicle to the actuation of its control devices. The evasive maneuver is then executed along the alternative trajectory.

For example, if the limit of adhesion of the tires was exceeded during the actuation of the control devices, it can be determined where the limits in the current situation lie based on the reaction of the motor vehicle. Potential limiting values can be gauged in the given situation and a correction of the trajectory may be carried out based on the limiting values. However, if the road conditions are normal, the present method does not delay and the vehicle is driven along the optimal trajectory that represents its safest option.

According to a first potentially enhancing embodiment, it would be possible that a control algorithm decides on the alternative trajectory if the motor vehicle does not move along the nominal trajectory. Such a control algorithm can decide on how to proceed in the method in dependence on the input quantities.

According to another potential embodiment of the method, it is proposed to carry out a comparison between the nominal trajectory and the actual trajectory, wherein a deviation of parameters relevant to the driving dynamics is determined from the difference between the nominal trajectory and the actual trajectory. For example, the static friction in the longitudinal and lateral direction or the static friction overall of a tire can be determined from a comparison of the steering angle and the yaw rate, as well as a usually negative acceleration or deceleration of the motor vehicle. In this way, the determination of the optimal alternative trajectory is simplified.

In another embodiment of the method, a decision on the execution of the evasive maneuver along the alternative trajectory may be made within a time window for checking the performance of the motor vehicle. This time window may lie, in particular, at the beginning of the evasive maneuver such that a corresponding decision on the evasive maneuver can be made within this initial, usually short period. If it is determined, for example, that an impact with the obstacle is unavoidable, it is possible to initiate further measures prior to the impact or in other words an impact mode such as, for example, activating belt tensioners, closing open windows and sunroofs, deploying rollover bars and the like. In one embodiment of the method, a comparison between nominal trajectory and actual trajectory can be carried out within this time window.

According to another aspect of the presently described method, it would be possible to store vehicle-related driving dynamics parameters in a database in the motor vehicle. Such driving dynamics parameters may include limits of longitudinal and lateral accelerations, inertia tensors, moments of inertia and the like. The driving dynamics parameters stored in the database allow a vehicle-specific calculation of the nominal trajectory. The difference between different motor vehicle types can thereby be taken into consideration.

According to another aspect of the method, the database may be actively updated or in other words taught specific to the motor vehicle. In this way, changes of the vehicle-specific parameters resulting, for example, from different tires, the wear of shock absorbers and brakes, etc., can be taken into consideration.

According to another aspect of the presently described method, the driving dynamics parameters in the database make it possible to calculate the nominal trajectory in a model-based fashion. In this way, a simulation may be carried out based on a model of the motor vehicle in order to determine the ideal trajectory.

According to another potential aspect of the presently described method, it is proposed that an automatic steering control action and/or an automatic braking control action is carried out in order to execute the evasive maneuver. In this way, the motor vehicle assumes control over the evasive maneuver such that a negative influence of non-optimal human behavior can be avoided. In fact, the given circumstances can be optimally utilized.

According to another aspect of the presently described method, it is proposed that a counter steering control action is carried out in the case of a swerving motor vehicle in order to bring the motor vehicle under control. In this way, potential negative consequences of the evasive maneuver become less probable and the occupants of the motor vehicle as well as other participants in traffic may be protected from any potential impact.

According to an additional aspect of the presently described method, it is proposed that a braking maneuver with the greatest braking power possible is initiated if the road conditions make it impossible to evade the obstacle. In this way, the kinetic energy of the motor vehicle can be reduced to a minimum prior to the impact. The risk to the occupants and potentially to the obstacle may be minimized.

According to another embodiment, it is proposed that the nominal trajectory is a nominal path. A nominal path may be a region, within which the motor vehicle executes the evasive maneuver. This makes it possible to define a certain tolerance range, within which the evasive maneuver can be executed as calculated. The calculation of an alternative trajectory can then be avoided. A route correction only becomes necessary if the motor vehicle leaves the corresponding region of the nominal path. This makes it possible to cover situations, for example, in which the road conditions only deviate slightly from the normal road conditions, on which the calculation of the nominal path is based.

The present disclosure also provides a control system for executing an evasive maneuver of a motor vehicle. The control system includes a device or sensor for detecting an obstacle, a control unit or processor configured to calculate a nominal trajectory and to actuate control devices of the motor vehicle in such a way that the motor vehicle drives along the nominal trajectory under normal road conditions.

The control unit is designed for executing the evasive maneuver as calculated if the motor vehicle moves along the nominal trajectory. The control unit is furthermore designed for calculating an alternative trajectory based on the reaction of the motor vehicle to the actuation of its control devices if the motor vehicle does not move along the nominal trajectory. The alternative trajectory is a trajectory that is actually possible with respect the driving dynamics under the given road conditions, under which the evasive maneuver is executed.

According to a first additional aspect of the system, it is proposed that the control unit features a control algorithm that decides on the alternative trajectory.

According to another aspect of the system, it is proposed that the control unit is designed for carrying out a comparison between the nominal trajectory and the actual trajectory and for determining a deviation of parameters relevant to the driving dynamics from the difference between the nominal trajectory and the actual trajectory.

According to yet another aspect of the presently described control system, it is proposed that the control unit is designed for making a decision on the execution of the evasive maneuver along the alternative trajectory within a time window for checking the performance of the motor vehicle. A timing unit is provided for defining the time window and may form part of the control unit.

According to an enhancement of the control system, a memory may be provided, in which a database with vehicle-related driving dynamics parameters is stored. The memory is connected to the control unit.

According to another aspect, it is proposed that the database is taught specific to the motor vehicle, wherein the control unit is to this end designed for adapting the database based on the actual performance of the motor vehicle.

In another embodiment of the control system, the control unit may be designed for calculating the nominal trajectory in a model-based fashion with the aid of the driving dynamics parameters in the database.

According to another aspect of the presently described control system, it is connected to a control devices of the motor vehicle such as a steering system and/or a brake system in order to carry out an automatic steering control action and/or an automatic braking control action. The control system may furthermore be connected to an engine control in order to carry out, if applicable, a control action in the form of powertrain control such as an acceleration or deceleration.

According to another aspect of the control system, the control unit may be designed for carrying out a counter steering control action in the case of a swerving motor vehicle in order to better control the motor vehicle during the swerving state.

According to another aspect, it is proposed that the control unit is designed for initiating a braking maneuver with the greatest braking power possible if the road conditions make it impossible to evade the obstacle.

According to yet another aspect, it is proposed that the control unit is designed for calculating a nominal path, which has a certain tolerance range, instead of a nominal trajectory.

The present disclosure further provides a computer program product with a machine-readable storage medium, on which commands are embedded that, when executed by an control unit, cause the control unit to carry out a method according to the above-described aspects. The storage medium may include a memory and the control unit may include a control unit of the motor vehicle.

The present disclosure also provides a motor vehicle with a control unit and a memory, in which the above-described computer program product is stored. A corresponding motor vehicle makes it possible to execute an automatic evasive maneuver in such a way that the respective road conditions are utilized in the best possible fashion.

According to a first potentially enhancing embodiment of the motor vehicle, at least one object detection sensor pointing in the driving direction may be provided. Such an object detection sensor may include, for example, of a camera, a radar unit, a lidar unit or the like, alone or in combination. It is likewise possible to use several object detection sensors, namely also sensors that utilize different technologies.

According to another aspect of the motor vehicle, the control unit may be connected to control devices of the motor vehicle. In this way, the control unit can act upon the accelerator, the brake system and the steering system in order to execute the evasive maneuver.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
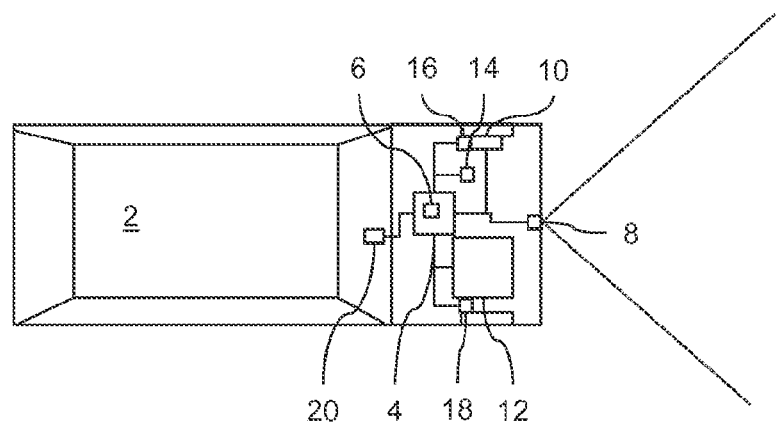
FIG. 1 shows a top view of a motor vehicle, in accordance with an embodiment.

FIG. 1 shows a motor vehicle 2. The motor vehicle 2 is configured to execute an automatic evasive maneuver with the aid of a control unit 4. The method for executing the evasive maneuver is described in greater detail below in connection with FIG. 4. The evasive maneuver is executed in such a way that the best possible evasive maneuver is executed under normal road conditions and a rapid correction of the evasive maneuver in dependence on the road conditions can be realized under non-optimal road conditions. The motor vehicle 2 features a control unit 4 for executing the evasive maneuver. The control unit 4 may include other functions such as, for example, those of a stability control program and other driving dynamics aspects, e.g. a quick-start program for carrying out an acceleration with maximum accelerating power and the like.

The control unit 4 features a memory 6, in which a computer program product is stored that, when executed by the control unit 4, makes it possible to execute the evasive maneuver. A database with driving dynamics data related to the motor vehicle 2 is furthermore stored in the memory 6 and used for calculating a nominal trajectory of an evasive maneuver. The nominal trajectory is calculated in a model-based fashion with the aid of the data on the motor vehicle 2 stored in the database.

The control unit 4 is furthermore connected to a sensor 8 such as a radar sensor that scans a traffic space in front of the motor vehicle 2 and searches this traffic space for obstacles located in the driving path of the motor vehicle 2. The control unit 4 is also connected to a brake system 10 such that the brake system 10 can be actuated by means of the control unit 4. The control unit 4 is furthermore connected to an engine 12 or an engine control of the engine 12, as well as to a steering actuator 14. The control unit 4 therefore can actuate the brake system 10, the engine 12 and the steering actuator 14 accordingly in order to execute an evasive maneuver. Consequently, the control unit 4 can accelerate, decelerate and steer the motor vehicle.

A series of sensors such as, among other things, wheel speed sensors 16, a steering angle sensor 18 and an acceleration sensor 20 are provided in order to check the reaction of the motor vehicle 2 to control inputs. These sensors 16, 18, 20 make it possible to determine driving dynamics parameters and to check the reaction of the motor vehicle 2 to control inputs. For example, the wheel speed sensors 16 make it possible to detect a wheel slip, from which the maximum static friction under the given road conditions can be determined. The steering angle sensor 18 and the acceleration sensor 20 furthermore make it possible to carry out a comparison between the steering angle and the current yaw rate, which is dependent on the steering angle, and to determine lateral adhesive forces under the given road conditions. Other sensors such as, for example, a Global Positioning System (GPS) sensor may be provided for determining the driving dynamics parameters.

Figure 2:
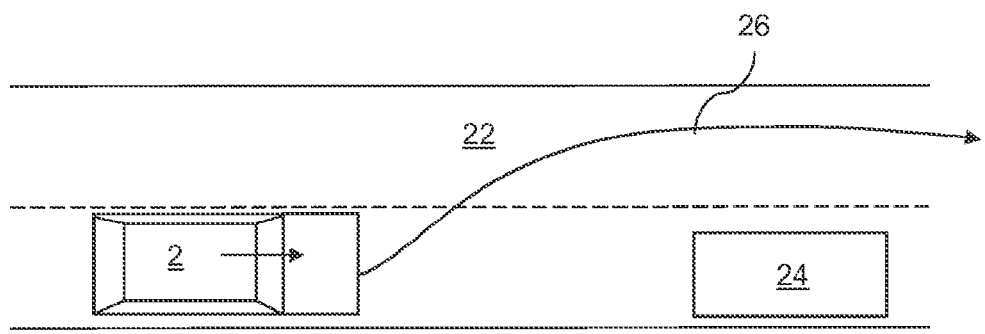
FIG. 2 shows a top view of a traffic situation, wherein the motor vehicle must evade an obstacle by executing an evasive maneuver along a nominal trajectory path.

FIG. 2 shows a traffic situation on a road 22. An obstacle 24 is located in front of the motor vehicle 2 referred to the driving direction. If the motor vehicle 2 would continue to drive on its current route, a collision between the motor vehicle 2 and the obstacle 24 would occur.

The obstacle 24 is detected with the aid of the sensor 8. Depending on the traffic situation, the control unit 4 calculates a nominal trajectory 26 in a model-based fashion by including the parameters relevant to the driving dynamics stored in the memory 6 of the control unit 4. According to the model-based calculation, the nominal trajectory 26 corresponds to the best possible trajectory of the motor vehicle 2 around the obstacle 24.

The control unit 4 carries out control actions in the brake system 10, the engine 12 and the steering actuator 14 in accordance with the calculation in order to move the motor vehicle 2 along the nominal trajectory 26. These control actions may include, for example, an actuation of the brake system 10, as well as the steering actuator 14, to the corresponding degree such that the motor vehicle 2 is decelerated as far as possible prior to evading the obstacle 24 and a steering maneuver, which steers the motor vehicle 2 around the obstacle 24, is subsequently executed.

The nominal trajectory 26 may be realized in the form of a nominal path that has a certain width, within which the motor vehicle 2 can move.

Figure 3:
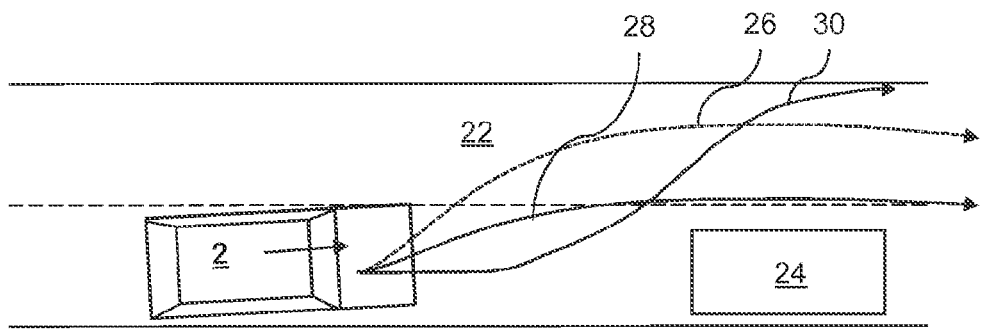
FIG. 3 shows the traffic situation according to FIG. 2 under different road conditions.

FIG. 3 shows the traffic situation according to FIG. 2 under different road conditions. In this situation, the adhesion factors are reduced (for example, due to wetness) from that illustrated in FIG. 2 and the motor vehicle 2 does not react to the steering and braking inputs as predicted by the model-based calculation, but rather moves on an alternate trajectory 28. Among other things, the attainable longitudinal and lateral accelerations on a wet road are not as high as on a dry road because the friction between the tires and the road is reduced.

Under these circumstances, the control unit 4 of the motor vehicle 2 detects the deviation between the actual trajectory 28 and the nominal trajectory 26 and determines the prevalent driving dynamics parameters on the road 22 under the predefined conditions from this deviation in a time window at the beginning of the evasive maneuver. An alternative trajectory 30 driven by the motor vehicle 2 is determined within the time window with the aid of these driving dynamics parameters. Depending on the road conditions, the alternative trajectory 30 may also lead to an impact with the obstacle 24, wherein a full braking maneuver may be initiated in this case in order to reduce the kinetic energy of the motor vehicle 2 as far as possible when the impact occurs.

Figure 4:
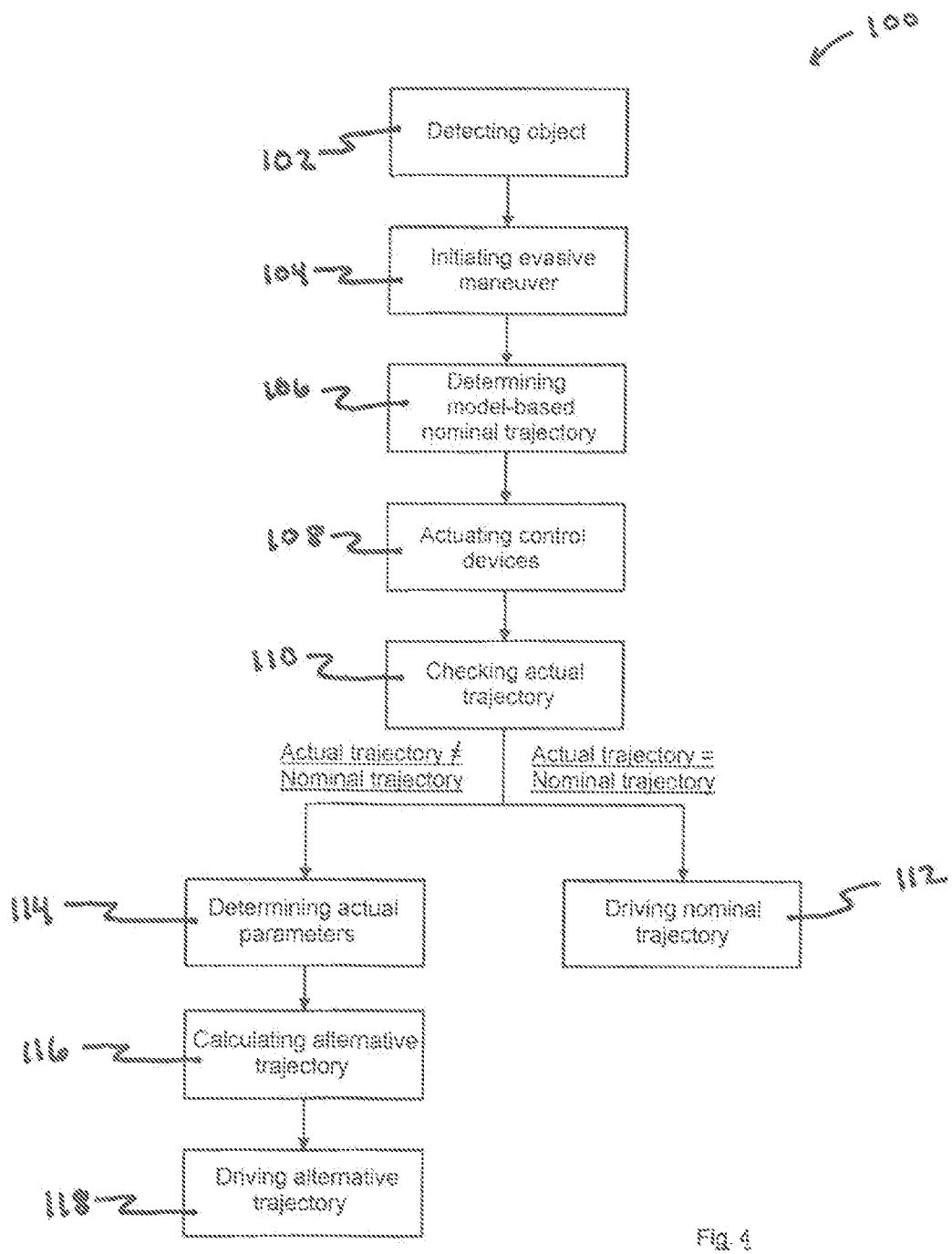
FIG. 4 shows a flowchart for a method of stability control.

FIG. 4 shows a flowchart of the method 100 for adaptive stability control. In a first step 102, an object leading to an impending collision with the motor vehicle 2 is detected. An automatic evasive maneuver is initiated in a second step 104. For this purpose, a nominal trajectory of the evasive maneuver is calculated in a third step 106 based on the current driving condition of the motor vehicle 2 and the traffic situation such as, for example, the position of the obstacle, the width of the road, other vehicles or objects in traffic, etc., by means of model-based methods.

In the next step 108, control devices of the motor vehicle 2 are actuated in such a way that the motor vehicle 2 is under normal conditions moved along the nominal trajectory. An actual trajectory is detected within a time window after the initiation of the evasive maneuver and compared with the nominal trajectory at step 110. If the actual trajectory corresponds to the nominal trajectory, the vehicle is driven along the nominal trajectory as indicated at step 112.

If the actual trajectory deviates from the nominal trajectory, current driving dynamics parameters are determined at step 114 based on the deviations between the actual trajectory and the nominal trajectory such as, for example, between a predefined yaw rate and the actual yaw rate and between a predefined braking power and the actual braking power.

An actually possible alternative trajectory is calculated at step 116 with the aid of the actual parameters and the evasive maneuver is executed along the alternative trajectory at step 118.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for executing an evasive maneuver of a motor vehicle having at least one control device for operating the motor vehicle, the method comprising:

initiating, by a processor, an evasive maneuver when an obstacle is detected in a drive path of the motor vehicle;

determining, by the processor a nominal trajectory of the motor vehicle to execute the evasive maneuver;

actuating, by the processor the at least one control device causing the motor vehicle to drive along the nominal trajectory under normal road conditions;

determining, by the processor, when the motor vehicle is not travelling along the nominal trajectory by comparing the nominal trajectory and an actual trajectory of the motor vehicle;

determining current driving dynamics and road conditions based upon the difference between the nominal trajectory and the actual trajectory;

determining, by the processor, an alternative trajectory as a function of the determined current driving dynamics and road conditions when the motor vehicle is not travelling along the nominal trajectory; and actuating, by the processor, the at least one control device causing the motor vehicle to drive along the alternative trajectory.

2. The method of claim 1, wherein determining if the motor vehicle is travelling along the nominal trajectory is made within a pre-determined time period from actuating the at least one control device.

3. The method of claim 1, further comprising storing vehicle-related driving dynamics parameters in a database in the motor vehicle.

4. The method of claim 3, wherein the method further comprises updating the vehicle-related driving dynamics parameters of the motor vehicle.

5. The method of claim 3, wherein the method further comprises calculating the nominal trajectory in a model-based fashion with the aid of the driving dynamics parameters in the database.

6. The method of claim 1, wherein the actuating further comprises executing at least one of an automatic steering control action and an automatic braking control action to perform the evasive maneuver.

7. The method of claim 6, wherein the method further comprises executing a counter steering control action when the motor vehicle is swerving to bring the motor vehicle under control.

8. The method of claim 6 wherein the method further comprises initiating a braking maneuver to minimize a kinetic energy of the vehicle when the road conditions make it impossible to evade the obstacle.

9. A computer program product with a non-transitory machine-readable storage medium, on which commands are embedded that, when executed by a control unit, cause the control unit to carry out a method according to claim 1.

10. A motor vehicle comprising a control unit featuring a memory with a computer program product of claim 9.

11. The motor vehicle of claim 10, wherein the motor vehicle further comprises at least one object detection sensor that points in the driving direction.

12. The motor vehicle of claim 10, wherein the control unit is operably connected to the at least one control device of the motor vehicle.

* * * * *